United States Patent
Hellström et al.

(10) Patent No.: US 10,341,026 B2
(45) Date of Patent: Jul. 2, 2019

(54) OPTICAL BUS

(71) Applicant: AROS ELECTRONICS AB, Mölndal (SE)

(72) Inventors: Jerker Hellström, Nol (SE); Per Lundberg, Billdal (SE); Magnus Wide, Mölnlycke (SE)

(73) Assignee: AROS ELECTRONICS AB, Mölondal (SE)

( * ) Notice: Subject to any disclaimer, the term of this patent is extended or adjusted under 35 U.S.C. 154(b) by 0 days.

(21) Appl. No.: 16/090,872

(22) PCT Filed: Mar. 27, 2017

(86) PCT No.: PCT/EP2017/057217
§ 371 (c)(1),
(2) Date: Oct. 3, 2018

(87) PCT Pub. No.: WO2017/174389
PCT Pub. Date: Oct. 12, 2017

(65) Prior Publication Data
US 2019/0123828 A1   Apr. 25, 2019

(30) Foreign Application Priority Data

Apr. 6, 2016 (EP) ..................... 16164061

(51) Int. Cl.
G06F 13/40 (2006.01)
H04L 12/40 (2006.01)
H04B 10/278 (2013.01)

(52) U.S. Cl.
CPC ....... *H04B 10/278* (2013.01); *G06F 13/4063* (2013.01); *H04L 12/40019* (2013.01)

(58) Field of Classification Search
CPC ............. H04B 10/278; H04L 12/40019; G06F 13/4063
See application file for complete search history.

(56) References Cited

U.S. PATENT DOCUMENTS 5,842,889 A    12/1998  Kollmann
6,141,349 A *  10/2000  Ikeda ...................... H04L 12/44
                                                          370/403

(Continued)

FOREIGN PATENT DOCUMENTS

EP          2672662 A1    12/2013

OTHER PUBLICATIONS

PCT International Search Report and Written Opinion for PCT/EP2017/057217 (published as WO2017/174389) which is the parent application to the instant application, dated Jun. 16, 2017, (13 pages).

(Continued)

*Primary Examiner* — Casey L Kretzer
(74) *Attorney, Agent, or Firm* — Harness, Dickey & Pierce, PLC; Anthony G. Fussner

(57) ABSTRACT

An optical bus system (1) having a start-up state and at least one operating state is disclosed. The optical bus system (1) includes a mechanical support structure (21) arranged to receive and hold a master module (2) having a downstream optical interface (3) and a set of slave modules (6) each having an upstream optical interface (7) and a downstream optical interface (8). The modules are attached to the mechanical support structure (21) such that optical interfaces of adjacent modules are aligned and in close proximity to each other in order to enable optical communication (24, 25) between adjacent modules. Each slave module (6) is further provided with circuitry to form one or two shunting signal paths (30, 31) depending on operating state after an addressing procedure is completed in the start-up state. Hereby, it is e.g. possible to realize a robust and cost-efficient optical bus system with high bandwidth capability.

16 Claims, 7 Drawing Sheets

(56) References Cited

U.S. PATENT DOCUMENTS

| | | |
|---|---|---|
| 6,448,671 B1 | 9/2002 | Wallace et al. |
| 6,751,682 B1* | 6/2004 | Stirling ............... G06F 12/0669 709/220 |
| 2007/0204082 A1 | 8/2007 | Shimizu |
| 2008/0091862 A1 | 4/2008 | Hiraka |
| 2011/0268455 A1* | 11/2011 | Lorenz ............... G05B 19/0421 398/140 |
| 2014/0281079 A1 | 9/2014 | Biskup |

OTHER PUBLICATIONS

Europea Search Report for EP Application No. 16164061.0 which is the parent applicaton to the instant application, dated Sep. 30, 2016 (9 pages).

* cited by examiner

OPTICAL BUS

This patent application is a U.S. national stage filing under 35 U.S.C. § 371 of PCT International Application No. PCT/EP2017/057217 filed Mar. 27, 2017 (published as WO2017/174389 on Oct. 12, 2017), which claims priority to and the benefit of European Application No. 16164061.0 filed Apr. 6, 2016. The entire contents of these applications are incorporated herein by reference in their entirety.

TECHNICAL FIELD OF THE INVENTION

The present invention relates to an optical bus communication system.

BACKGROUND

An often very important and central part of modern electric systems is a so called bus. Briefly described, a bus is a communication system or communication path that transfers data between different functional (or peripheral) units in a computer or between computers. Early buses consisted of parallel wires between different units, while today the term is used to describe all types of devices that distribute information between different functional units in a computer or between different units in an industrial system. To some context it can be said that the different functional units form different subsystems that are integrated into a larger bus system which enables data transfer, addressing, controlling, etc.

A common type of bus architecture has a plurality of functional units, so called modules, which are connectable to a common communication line and where each module has its own processing unit. Some modules may be provided with an input/output (I/O) interface in order to enable external units to communicate with the processing unit. These types of systems are for example used in various vehicles, such as cars. Modern cars are generally provided with a computer that monitors/oversees different aspects and functions of the car. The monitoring is often realized with the help of various sensors that provides information directly to the computer or other signals that indicate if a condition is true or false. Furthermore, modern cars often have a plurality of different subsystems such as breaking systems, airbags, cruise control, steering, lighting, windows, etc. and all of these are monitored and controlled by a computer. The communication path between these various subsystems and the computer, and also between the subsystems themselves, is then oftentimes provided by a bus.

An advantage with these systems or architectures is that the number and type of subsystems can be varied. For example, it is relatively simple to adapt the total system to specific applications and environments, updates and addition of functions is possible without the need of replacing the complete system, and also, maintenance and troubleshooting is facilitated since the subsystems can be isolated.

However, more and more problems are emerging due to rapid developments in computer technology during these last few decades and due to the need for larger subsystems, forcing the individual modules to handle more and more external units which consequently increase the amount of information that needs to be handled by the bus. The practical limitations of these buses are often related to their purely electrical contacts/connections, which have proven to be somewhat of a bottleneck in terms of bandwidth and efficiency.

An increasingly popular alternative to these electrical connections is to use optical solutions. Optical connections are generally associated with several advantages in comparison to their electrical counterpart, such as, e.g. improved bandwidth, reduced losses, robustness in terms of electromagnetic interference (EMI), etc.

There is however a number of problems and limitations associated with currently available optical buses. For example, they are oftentimes too expensive if they are to be as reliable as the electronic equivalent. Furthermore it has proven to be difficult to provide a relatively simple and cost-efficient (optical) architecture that fulfils requirements regarding speed and at the same time enables automatic addressing/positioning.

SUMMARY

It is accordingly an object of the present invention to provide an optical bus system which alleviates all or at least some of the above-discussed drawbacks of the presently known systems.

This object is achieved by means of an optical bus system as defined in the appended claims.

According to an aspect of the present invention, there is provided an optical bus system having a start-up state and an operating state, the system comprising:
  a mechanical support structure;
  a master module mechanically attached to the mechanical support structure, the master module comprising a downstream optical communication interface comprising a master optical transmitter and a master optical receiver;
  a set of slave modules mechanically attached to the support structure sequentially in a row next to the master module, the set of slave modules including a first slave module arranged next to the master module and at least one subsequent slave module, each slave module including:
    processing circuitry,
    an upstream optical communication interface comprising an upstream optical receiver and an upstream optical transmitter,
    a downstream optical communication interface comprising a downstream optical receiver and a downstream optical transmitter,
    a downstream signal path from the upstream optical receiver to the downstream optical transmitter via the processing circuitry, and
    an upstream signal path from the downstream optical receiver to the upstream optical transmitter via the processing circuitry;
  wherein the upstream optical communication interface of the first slave module is in optical contact with the downstream optical communication interface of the master module, and the upstream optical communication interface of each subsequent slave module is in optical contact with a downstream optical communication interface of a preceding slave module in the row, in order to enable optical communication between adjacent modules;
  wherein, during the start-up state, in each slave module, the processing circuitry is configured to implement a daisy-chain topology and to perform an addressing procedure whereby the master module is configured to retrieve a position and an identity code of each slave module;
  wherein, during the operating state, in each slave module, the processing circuitry is configured to close an upstream switch such that a shunting upstream signal path is formed from the downstream optical receiver to the upstream optical transmitter, in addition to the upstream signal path, the shunting upstream signal paths of the set of slave modules together forming an upstream optical bus allowing each slave module to communicate directly with the master module using the positions and identity codes.

Hereby, a simple and cost-efficient optical bus system is presented that is capable of automatic addressing and also has a superior bandwidth capability in comparison to presently known optical bus systems at a cheaper cost. The term exemplary is in the present context to be interpreted as serving as an example, instance, or illustration.

The mechanical support structure can be any conventional support structure capable of receiving and holding a plurality of modules, such as e.g. a conventional DIN rail, or a rail and corresponding lock fastening means as disclosed in U.S. Pat. No. 5,842,889, incorporated herein by reference. The processing circuitry can be a hardware based or software based solution or a combination thereof, as known in the art.

The terms downstream and upstream are in reference to the master module, i.e. downstream is to be interpreted as in a direction away from the master module along the chain of slave modules and upstream is the opposite direction (towards the master module). Thus, the upstream optical interface of a slave module is the interface of the slave module that is facing towards the master module when attached to the support structure, i.e. the surface of the slave module that has a normal vector towards the master module when the slave module is attached to the support structure. Therefore the optical components' labels are based on their physical position, i.e. based on if they are arranged at the upstream or downstream optical communication interface. Hence, the upstream optical receiver is actually positioned along the downstream signal path and receives a downstream signal, and the downstream optical receiver is accordingly positioned along the upstream signal path and receives an upstream signal.

The present invention is based on the realization that by providing an optical bus system having different operating states one can utilize the beneficial properties of using optical communication, such as e.g. good galvanic isolation between modules, simple and robust installation, compactness and also achieve increased bandwidth capabilities, in a cost-efficient manner. The present invention utilizes a bridging or shunting configuration for when the optical bus system is to switch to an operating state in order to increase the bandwidth capability and reduce response times. Moreover, during the start-up state the optical bus system is capable of efficiently providing the master module with a position and type of each slave module in the system. Furthermore, each optical communication interface is arranged with a separate optical receiver and optical transmitter, in order to allow for full-duplex operation.

Even further, by having the signal paths arranged within each module the system is easy to maintain and install and there are no complicated external structures or contacts to consider. In other words, the present invention enables simple installation/removal of individual modules to/from the optical bus system since there are no special contact arrangements between the individual modules which have been discovered to be a common source of error. Thus, a robust optical bus system is provided that is suitable for use in rough environments such as e.g. automotive or industrial applications, where the demands for reliability and robustness are very high. Each slave module may also be arranged with a separate/individual power supply in accordance with an exemplary embodiment. This further improves the galvanic isolation between each module, thus increasing the robustness of the system since possible errors can be isolated to individual modules.

During the start-up state the optical bus system implements a daisy-chain topology in order to perform an addressing procedure in a simple and robust manner, which will be exemplified and described in more detail in the detailed description. The addressing procedure serves generally to create an address for each slave module and to determine its physical position in the chain/row for initial system configuration purposes. Next, the optical bus system is configured to switch to a configuration with higher bandwidth capabilities which is done by introducing a shunting upstream signal path in each slave module which effectively allows the slave modules to form a common upstream signal path which enables each slave module to communicate directly with the master module. Additionally this also provides the last slave module in the set of slave modules with a direct communication path to the master module in accordance with a token ring topology. This operating state can be thought of as a semi-parallel state.

In accordance with an exemplary embodiment of the invention, the upstream signal path is connected between an upstream receiving node and an upstream transmitting node, and wherein the upstream transmitting node comprises an upstream tri-state buffer having a high-impedance mode;

wherein, during the operating state, in each slave module,
the processing circuitry is configured to generate a control signal such that the tri-state buffer is in the high impedance mode before the upstream switch is closed, in order to reduce bus contention.

This further increases the robustness of the optical bus system. In other words, the transmitting node, or TX node/pin of each slave module is provided with tri-state buffer capability which allows the optical bus system to control how many devices are able to send a signal on the upstream optical bus. Generally one would want to prevent more than one module from writing/transmitting on the upstream optical bus. A tri state buffer is to be understood as a logic gate capable of controlling the output signal by allowing the output port to assume a high impedance state in addition to the 0 and 1 logic levels, effectively removing the output from a circuit.

In accordance with another exemplary embodiment of the present invention the optical bus system further comprises a reset state, wherein during, said reset state, in each slave module, said processing circuitry is configured to, upon receipt of a reset signal having a pulse length of a predefined length at said upstream optical receiver, open said upstream switch and transmit said reset signal at said downstream optical transmitter, in order to reset the system to said start-up state The reset state is particularly useful in case of some error evolving in the system, e.g. a slave module having an interruption in its power supply, addressing procedure failing, software or hardware errors in the slave modules, etc. Thus, a simple and cost-efficient fail-safe mechanism is provided, which effectively increases the reliability of the optical bus system.

In accordance with another exemplary embodiment of the invention, the operating state is a first operating state and wherein the optical bus system further comprises a second operating state, wherein, during the second operating state, in each slave module, the processing circuitry is configured to:
close a downstream switch such that a shunting downstream signal path is formed from first optical receiver to the downstream optical transmitter, in addition to the downstream signal path, the shunting downstream signal paths of the set of slave modules together forming a downstream optical bus so that information received by the optical receiver of the first slave module is broadcasted to all slave modules in the set, whereby the master module can communicate directly with each slave module in the set of modules using the positions and identity codes; and close an upstream switch such that a shunting upstream signal path is formed from the downstream optical receiver to the upstream optical transmitter, in addition to the upstream signal path, the shunting upstream signal paths of the set of slave modules together forming an upstream optical bus allowing slave module to communicate directly with the master module using the positions and identity codes.

This introduces another operating state in the system where broadcast messaging is enabled, thus, further increasing the bandwidth of the optical bus system. In this embodiment the master module is effectively connected in parallel with each slave module in the optical bus system, thus this second operating state can be thought of as a parallel state.

In accordance with yet another exemplary embodiment of the present invention, the downstream signal path is connected between a downstream receiving node and a downstream transmitting node, and wherein the downstream transmitting node comprises a downstream tri-state buffer having a high-impedance mode;

wherein, during the second operating state, in each slave module, the processing circuitry is configured to generate a control signal such that the downstream tri-state buffer is in the high impedance mode mode before the downstream switch is closed, in order to reduce bus contention. Similarly to the previously described embodiment with the tri-state buffer arranged in the upstream signal path this also increases the robustness of the optical bus system.

In accordance with yet another exemplary embodiment, the optical bus system further comprises a reset state, wherein during, the reset state, in each slave module, the processing circuitry is configured to, upon receipt of a reset signal having a pulse length of a predefined length at the upstream optical receiver, open the upstream switch, open the downstream switch and transmit the reset signal at the downstream optical transmitter, in order to reset the system to the start-up state. This is an additional reset state in order to bring the optical bus system back to the start-up state from the second operating state. Other than that, this procedure largely analogous to the above described reset procedure in association with the first operating state (i.e. semi-parallel state).

In accordance with yet another exemplary embodiment, wherein each adjacent upstream communication interface and downstream communication interface arranged in optical contact with each other includes a downstream optical communication path and an upstream optical communication path; and wherein the optical bus system comprises an optical shield arranged between each downstream optical communication path and upstream communication path, in order to reduce crosstalk and enable full-duplex communication. The two optical communication paths formed between each adjacent module are according to this embodiment preferably separated by an optical shield such that the risk of potential cross-talk is significantly reduced. In other exemplary embodiments the two optical communication paths may instead be separated by a sufficient distance such that light emitted from the optical transmitter in the downstream optical communication path cannot reach the optical receiver in the upstream optical communication path, and vice versa. This may however not be feasible in some application due to e.g. space requirements or circuit topology, thus an optical shield may be a useful solution in such a case in order to enable full-duplex communication between two modules. The optical shield comprises, in one exemplary embodiment, a protruding member arranged between the optical transmitter and the optical receiver of the downstream communication interface, and wherein the protruding member is arrangeable in a corresponding recess arranged between the optical transmitter and the optical receiver of the upstream communication interface.

In yet another exemplary embodiment the downstream optical interface of the master module comprises one optical window in optical connection with each of the master optical transmitter and the master optical receiver via an optical guide;

wherein the downstream optical interface of each slave module comprises one optical window in optical connection with each of the downstream optical transmitter and the downstream optical receiver via an optical guide; and wherein the upstream optical interface of each slave module comprises one optical window in optical connection with each of the upstream optical transmitter and the upstream optical receiver via an optical guide.

This is an alternative to having an optical shield arranged between the two optical paths formed between adjacent optical interfaces. The light guides serve a similar purpose as to ensure that light transmitted from an optical transmitter is properly directed towards the intended optical receiver in order to reduce cross-talk. Furthermore the need for connectors or connection structures between adjacent modules is diminished which facilitates installation and removal of individual modules in the system. The optical guides also increase the robustness of the system as the need for perfect alignment of adjacent modules is reduced, i.e. adjacent modules can be slightly misaligned or separated and still function. The term "optical window" is to be understood as a type of window, i.e. a plate or disc made of transparent material, provided in a housing of the master module and slave module and arranged such that optical signals can be transmitted/received through the window by a transmitter/receiver arranged within the housing of each module.

These and other features of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION

In the following detailed description, some embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Figure 1:
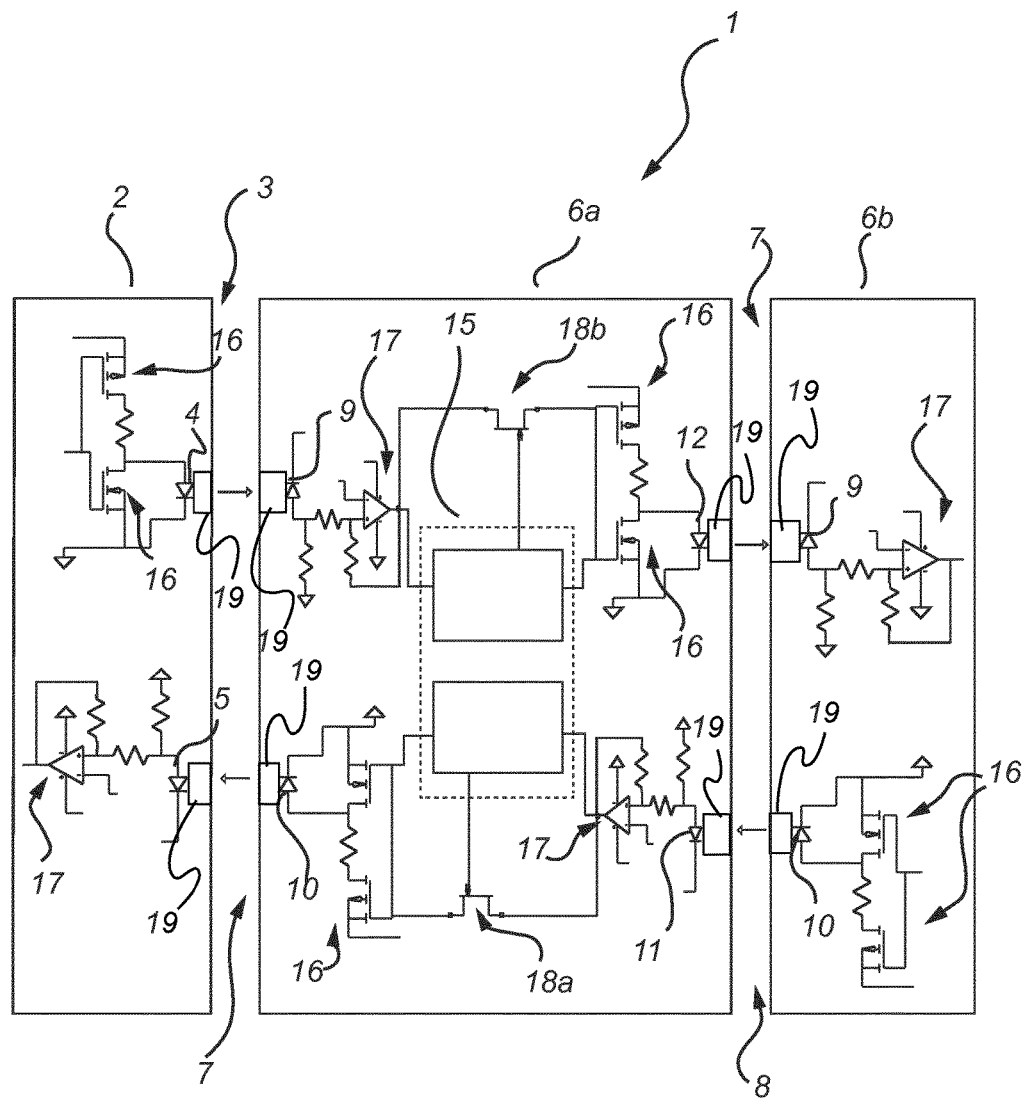
FIG. 1 illustrates a schematic circuit of an optical bus system in accordance with an embodiment of the present invention.

FIG. 1 illustrates a schematic circuit of an optical bus system 1 in accordance with an embodiment of the present invention. The optical bus system 1 includes a master module 2 comprising a downstream optical communication interface 3 which includes a master optical transmitter 4, here in the form of an LED (light emitting diode, e.g. an IR-LED) and a master optical receiver 5, here in the form of a photo diode. The term "master" in connection with the two optical components 4, 5 serves merely to facilitate the readability by providing a label.

Further the optical bus system 1 comprises a set of slave modules 6, here only two slave modules 6a, 6b are illustrated, but a set can be any suitable number depending on intended application and specification. Moreover some components or parts may only be illustrated in the first slave module 6a, for practical reasons and to improve visibility in the drawings, but it is however to be understood that each slave module may comprise the same or equivalent components in terms of function.

The slave modules 6 are arranged sequentially in a row next to the master module 2 (which is further clarified in reference to FIGS. 2a-b and FIGS. 3a-b). A first slave module 6a is arranged immediately adjacent to the master module 2. Each slave module 6 comprises processing circuitry 15, shown here in a block representation. Furthermore, each slave module includes an upstream optical communication interface 7 comprising an upstream optical receiver 9, here in the form of a photo diode, and an upstream optical transmitter 10, here in the form of an LED (e.g. IR-LED). Each slave module 6 further comprises a downstream optical communication interface 8, having a downstream optical receiver 11 (e.g. photo diode) and a downstream optical transmitter 12 (e.g. IR-LED). The terms downstream and upstream are in reference to the master module 2, i.e. downstream is to be interpreted as in a direction away from the master module 2 along the chain of slave modules 6 and upstream is the opposite direction (towards the master module 2). Thus, the upstream optical interface of a slave module is the interface of the slave module that is facing towards the master module when attached to the support structure, i.e. the surface of the slave module that has a normal vector towards the master module when the slave module is attached to the support structure. Furthermore there is a downstream signal path from the upstream optical receiver 9 via the processing circuitry 15 to the downstream optical transmitter 12 and an upstream signal path from the downstream optical receiver 11 via the processing circuitry to the upstream optical transmitter 10; however, both of these shunting signal paths will be further discussed in reference to FIGS. 4a-b and FIGS. 5a-b.

Even further, the master module 2 and slave modules 6 also include transmitting circuitry comprising MOSFETs 16 (metal-oxide-semiconductor field-effect transistors) acting as relays for supplying a voltage to the optical transmitters 4, 10, 12, controlled by a gate signal, generated by the processing circuitry 15 and applied at the gate of each MOSFETs 16. The slave modules 6 also include receiving circuitry in the form of a comparator 17 with one input connected to an optical receiver 5, 9, 11 and the other input connected to a reference voltage. The comparators 17 are each provided with a positive feedback circuit in order to introduce some hysteresis to the output of the comparators 17, improving the stability of the receiving circuitry. The slave modules 6 further include a pair of switches 18a-b in order to provide/remove a shunting signal path depending on which state (start-up, first/second operating state) the optical bus system 1 currently is in.

The upstream optical communication interface 7 of the first slave module 6a is in optical contact with the downstream optical communication interface 3 of the master module 2, in order to enable optical communication between the two, indicated by the arrows between them. Further, the upstream optical communication interface 7 of each subsequent module, in this illustration 6b, is in optical contact with a downstream optical communication interface 8 of a preceding slave module, in this illustration 6a, in order to enable optical communication optical communication between adjacent modules, as indicated by the arrows between the two slave modules 6a, 6b. The phrase "in optical contact" may be understood as that the corresponding transmitter/receivers of adjacent modules being aligned with and in close proximity to each other such that optical communication may be achieved.

Furthermore, the optical bus system 1 has a set of optical guides 19 arranged between each optical window (provided in a housing of each module) (see e.g. FIG. 2a-b) and an optical receiver 5, 9, 11 or optical transmitter 4, 10, 12. The optical guides 19 improve the optical connection between adjacent optical receivers and transmitter by properly directing the light towards an intended target as indicated by the arrows between the modules 2, 6. Hereby, the system can be made more robust and the need for optical contacts or structures, e.g. in the form of optical fibers arranged between adjacent modules, is diminished.

During a start-up state of the optical bus system 1, e.g. during configuration right after it has been installed, the processing circuitry 15 of each slave module 6 is configured such that the optical bus system 1 communicates in accordance with a daisy chain topology. That is, each slave module 6 forms a local network around itself, i.e. it can only communicate directly with adjacent modules. For instance, if the master module 2 is to send a message to a slave module 6 further down the row (e.g. slave module 6b), the message must travel through and to some extent be processed by every slave module 6 in between (i.e. slave module 6a). The daisy-chain network topology greatly facilitates an addressing procedure of the optical bus system 1, i.e. a procedure when the master module 2 retrieves a position (in the chain) of each slave module 6 and an identity code (e.g. type of module) of each slave module 6 in the optical bus system 1. The optical bus system may be arranged to operate in accordance with any communication protocol supporting flow control, data framing and error control, operating in either full or half duplex, such as MODBUS, HDLC or any custom designed protocol.

During an operating state (first operating state) of the optical bus system 1, the processing circuitry 15, of each slave module 6, is configured to close an upstream switch 18a, here in the form of a FET switch or communication switch, such that a shunting upstream signal path is formed from the downstream optical receiver 11 to the upstream optical transmitter 10 of each slave module 6. The processing circuitry 15 may control the upstream communication switch 18a by e.g. supplying a signal to the gate of the communication switch 18a. "Shunting signal path" can in the present context be interpreted as the processing circuitry 15 being effectively shunted. In this first operating state it results in that each slave module 6 is able to communicate directly with the master module 2, which increases the bandwidth of the system. Moreover, the optical bus system 1 can operate in accordance with a token-ring topology/ architecture since the last slave module 6 in the set of slave modules is effectively provided with a direct communication path to the master module 2. The functionality of the shunting upstream signal path will be further clarified in reference to FIGS. 4a-b.

During another operating state (second operating state) of the optical bus system 1, the processing circuitry 15, of each slave module 6, is configured to close a downstream switch 18b, such that a shunting downstream signal path is formed from the upstream optical receiver 9 to the downstream optical transmitter 12, in addition to the previously described formation of the shunting upstream signal path. This further increases the bandwidth of the optical bus system 1 by allowing the master module 2 to communicate directly with each slave module 6 and use broadcast messaging. As mentioned the optical bus system 1 may be configured to operate in accordance with any communication protocol supporting flow control, data framing and error control, operating in either full or half duplex. However, the optical bus system may be further configured to operate in accordance with a communication protocol supporting also multipoint communication and addressing possibilities. The communication protocol may further support extended redundancy, frame sequencing, heartbeat functionality for safety critical applications. Even further, the communication protocol may support distributed clock synchronization for critical timing requirements using protocol such as IEEE 1588.

The optical bus system 1 further has a reset state. The processing circuitry 15 of each slave module 6 is generally configured to monitor a signal received at the upstream optical receiver 9 (regardless of which state the system is in). However, upon receipt of a reset signal (e.g. a signal having a pulse length of a predefined length or a specific pulse pattern) at the upstream optical receiver 9, the processing circuitry 15 is configured to open the upstream switch 18a (and downstream switch 18b if the system is in the second operating mode) in order to break the shunting signal paths and bring the system back to a daisy-chain topology (i.e. start-up state). The reset state can e.g. be activated by the master module 2 if e.g. the addressing procedure fails, or if there is an interruption in a power supply which results in a slave module 6 losing its address or any other configuration parameter.

Figure 2A:
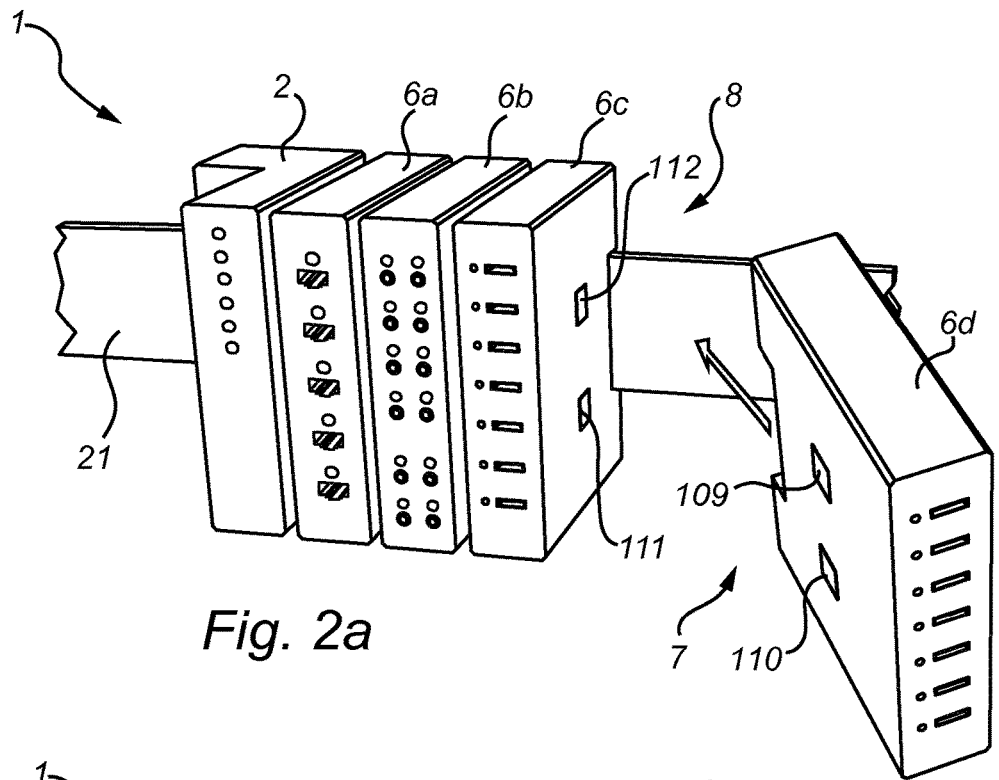
FIGS. 2a-b illustrate perspective views of an optical bus system in accordance with an embodiment of the present invention.
Figure 2B:
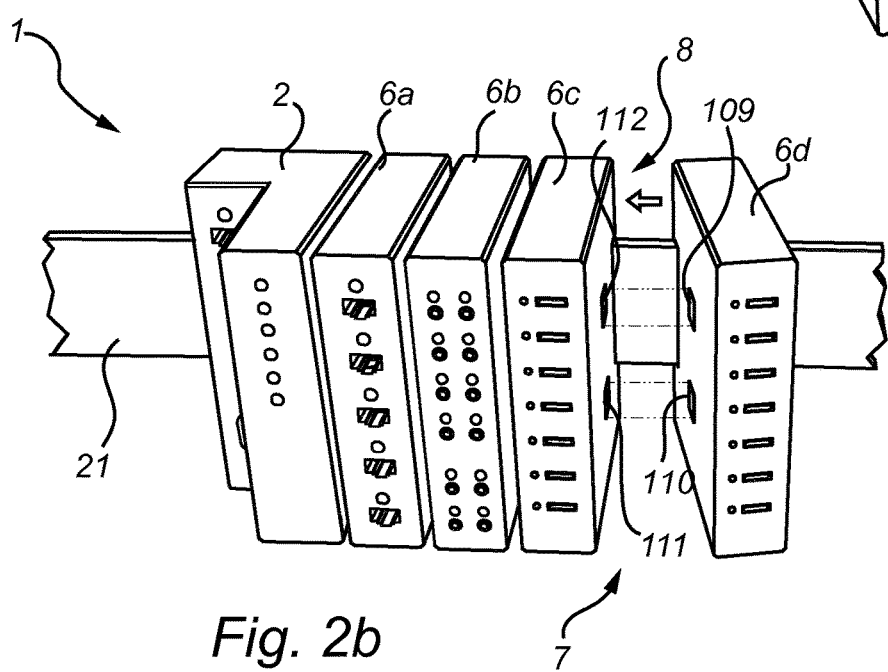

FIG. 2a illustrates a perspective view of an optical bus system 1 comprising a mechanical support structure 21, here in the form of a rail, such as, e.g. a DIN Rail. A master module 2 is mechanically attached to the rail 21 together with three slave modules 6a, 6b, 6c which are also mechanically attached to the rail 21, sequentially in a row next to the master module 2. The figure illustrates a fourth slave module 6d in the process of being installed and attached to the rail 21, as indicated by the arrow. FIG. 2b illustrates a subsequent step in the attachment of the fourth slave module 6d and serves to further show how the upstream optical interface of the fourth slave module 6d is intended to be in optical contact with the downstream optical interface of the preceding (third) slave module 6c, whereby two optical communication paths between the adjacent modules are formed. As described above in reference to FIG. 1 the downstream optical communication interface 8 of the third slave module 6c has a downstream optical transmitter 12 and a downstream optical receiver and the upstream optical communication interface 7 of the fourth slave module 6d has a corresponding upstream optical receiver 9 and an upstream optical transmitter 10. Thus, the optical communication between adjacent modules includes a downstream optical communication path between the downstream optical transmitter 12 and the upstream optical receiver 9 and an upstream optical communication path between the upstream optical transmitter 10 and the downstream optical receiver 11.

The reader should readily understand that all of the attached slave modules 6a, 6b, and 6c can comprise identical downstream and upstream optical interfaces, and the master module 2 comprises a corresponding downstream optical interface. This introduces additional dynamicity to the system 1, since any slave module 6a-d may be positioned at any position on the rail 21. Due to the lack of cumbersome electrical contacts between adjacent modules it is furthermore to be understood that a slave module may be installed (slid in and mechanically attached) between two already mechanically attached slave modules, and that the example illustrated in FIGS. 2a-b showing a slave module 6d being installed in a last position in the row of slave modules 6a-d is selected for illustrative purposes. Due to the fact that there only needs to be good alignment between the optical interfaces of adjacent modules the system 1 is simple to reconfigure and maintain as there are no complicated electrical contacts between adjacent modules that may be difficult to connect/disconnect, for example if a slave module 6a-d, at any position, needs to be replaced or if another slave module needs to be added.

The slave modules 6 are placed in close proximity to each other (see e.g. modules 6a, 6b, 6c) in order to ensure a good optical contact and to minimize the amount of ambient light hitting the optical receivers 9, 11 and thereby add noise to the optical signals. The optical windows 109, 110, 111, 112 (each associated with one of the optical receivers/transmitters 9, 10, 11, 12) are spaced sufficiently apart from each other on each individual module, in order to minimize cross-talk and enable full-duplex communication. The optical windows 109, 110, 111, 112 may be separated by a distance of e.g. 15-35 mm or 20-30 mm or 25 mm. The master module 2 also has a pair of optical windows provided in its housing at the downstream optical interface, they are however not shown in FIGS. 2a-b. The optical windows 109, 110, 111, 112 may for example be disc-shaped pieces of transparent glass or plastic, through which optical signals may be transmitted.

Figure 3A:
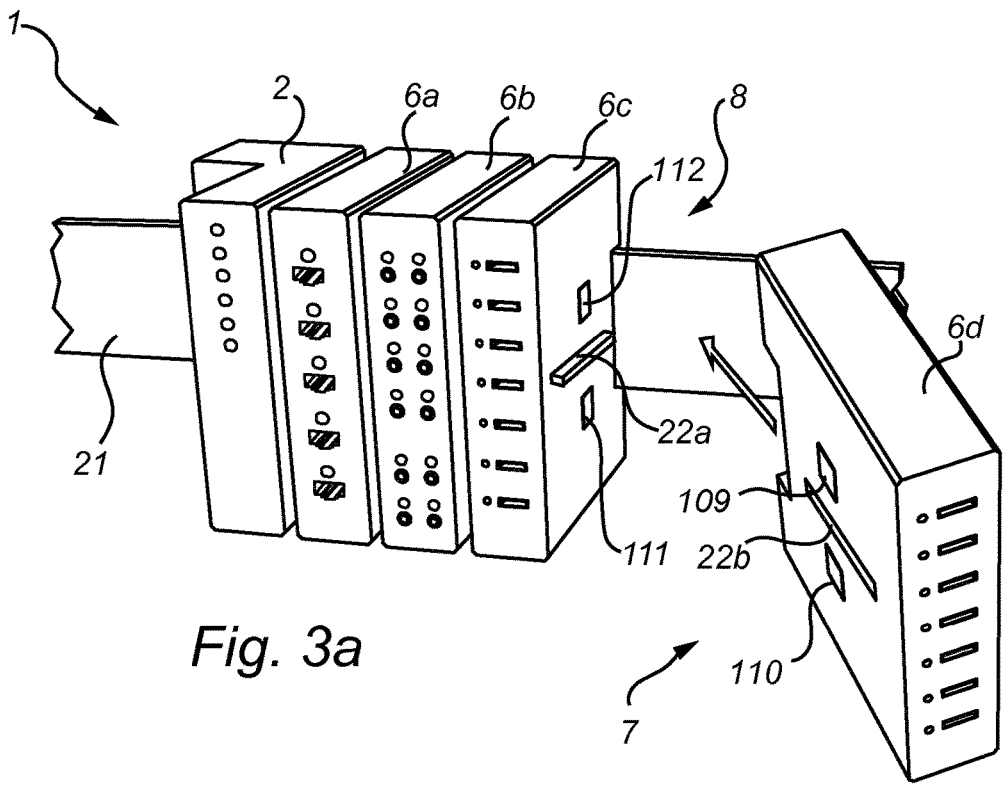
FIGS. 3a-b illustrate perspective views of an optical bus system in accordance with another embodiment of the present invention.
Figure 3B:
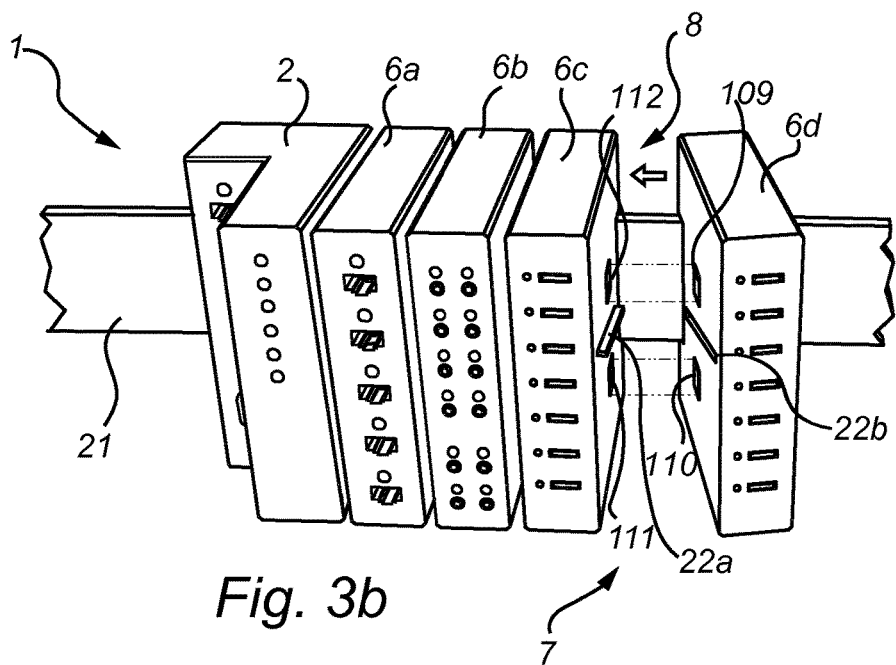

FIGS. 3a-b illustrates perspective views of an optical bus system 1 in accordance with another exemplary embodiment of the present invention. This particular example is to a large extent analogous in terms of function to the embodiment described above in reference to FIGS. 2a-b. However, in this embodiment an optical shield 22*a-b* is arranged between the downstream optical communication path (between transmitter 12 and receiver 9) and the upstream optical communication path (between transmitter 10 and receiver 11). By having an optical shield 22*a-b* arranged between the two optical communication paths potential crosstalk can be removed and full-duplex communication is enabled (i.e. two adjacent slave modules can both send and receive optical signals at the same time). Furthermore, the optical shield 22*a-b* improves the tolerances regarding the positioning of adjacent modules and thereby increases the robustness of the system 1. Even though the optical shield 22*a-b* is illustrated as a protruding member 22*a* arrangeable in a corresponding recess 22*b* other constructional solutions are feasible, e.g. the position of the protruding member 22*a* and the recess 22*b* may be interchanged, a thin layer of a resilient material may be used instead, each optical window 109, 110, 111, 112 may be provided with a frame of resilient material, and so on. The protruding member 22*a* may also be retractable (into the housing of the associated slave module 6) in order to allow for installation/positioning between two modules.

Figure 4A:
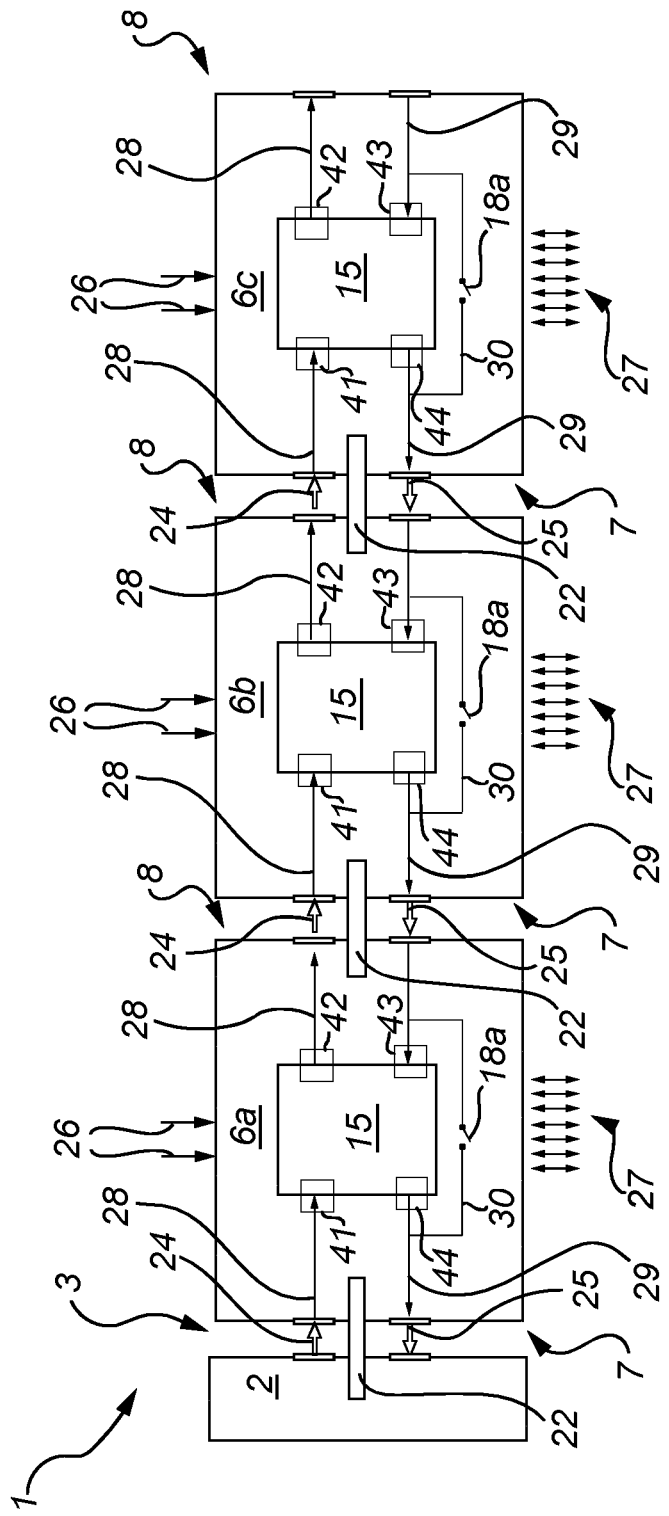
FIG. 4a illustrates a block diagram representation of an optical bus system in a start-up state in accordance with an embodiment of the present invention.

FIG. 4*a* illustrates an optical bus system 1 operating in a start-up state in a block diagram representation; the optical bus system has a master module 2 with a downstream optical communication interface 3, and three slave modules 6*a-c*. The slave modules 6*a-c* are arranged sequentially in a row next to the master module 2, where a first slave module 6*a* is arranged next to the master module 2. Each slave module 6 includes processing circuitry 15, an upstream communication interface 7, and a downstream communication interface 8. Each slave module further has a downstream signal path 28 from the upstream optical receiver to the downstream optical transmitter via (or through) the processing circuitry. None of the optical receivers or optical transmitters are explicitly indicated in the figure in order to improve visibility, see e.g. references 9-12 in FIG. 1 instead. Moreover each slave module also has an upstream signal path 29 from the downstream optical receiver via the processing circuitry 15.

The upstream optical communication interface 7 of the first slave module 6*a* is in optical contact with the downstream optical communication interface 3 of the master module 2, as indicated by the arrows between them representing the downstream optical communication path 24 and the upstream optical communication path 25. Further, each subsequent slave module 6*a*, 6*b* has its upstream optical communication interface arranged in optical contact with the downstream optical communication interface of the preceding slave module. The optical communication paths between each slave module are indicated by the arrows 24, 25. An optical shield 22 is arranged between the downstream optical communication path 24 and the upstream optical communication path 25 in order to minimize cross-talk.

Each slave module 6 is arranged with individual/separate power supplies 26, further improving the dynamicity of the system 1 since there is no common power line or supply sharing which would complicate the overall structure. The slave modules 6 may however share a common power supply without departing from the scope of the invention. Moreover, the slave modules may be arranged with an I/O (input/output) interface, as indicated by the double-headed arrows 27. While the optical bus system 1 is in the start-up state each slave module 6 forms a local network around itself since it can only directly communicate with immediately adjacent modules. Thus data sent from the master module intended for the last slave module 6*c* in the chain, must pass through (and be processed by) all preceding slaves 6*a*, 6*b* in the chain. This is known as a daisy-chain topology and the general properties of it need not be further discussed as they are readily known by the skilled artisan.

The optical bus system 1 operates in the start-up state in order to perform an addressing procedure whereby the master module 2 is configured to retrieve a position (in the rack/on the rail) and an identity code (e.g. type of module, status, etc.) of each slave module 6 in the system 1. The addressing procedure may be described as, after system start-up, the master module 2 is configured to send an optical signal downstream "asking" if there is anyone there, the first slave module 6*a* is configured to reply by stating position and identity-code (e.g. type). Next, the master module 2 "asks" if there is anyone else there, the first slave module 6*a* receives the "second question" and sends it further downstream as an optical signal from its downstream optical interface 8 where it is received by the second slave module's 6*b* upstream optical interface 7. The second salve module 6*b* then replies by stating position and identity-code (e.g. type) and transmits the information via its upstream optical interface 7 which is received by the first slave module 6*a*, which subsequently sends this information to the master module 2. This process is repeated until there are no more slave modules 6 in the chain. After the addressing procedure is completed, all of the slave modules 6 know their position in the chain (or on the rack 21), and the master module 2 knows the type and position of each slave module 6.

Figure 4B:
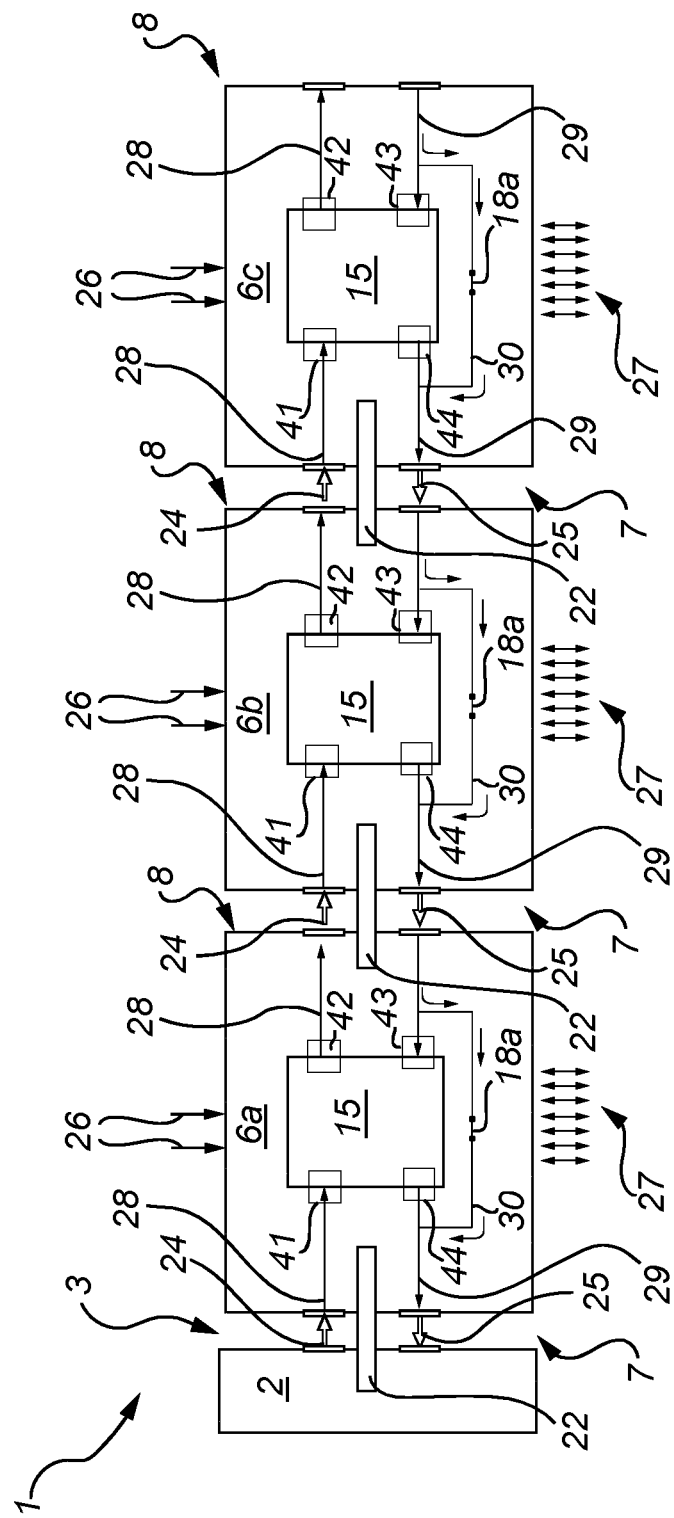
FIG. 4b illustrates a block diagram representation of the optical bus system from FIG. 4a in a first operating state.

Next, the system 1 is configured to switch to an operating state (first operating state). The master module 2 sends a control signal, to the first slave module 6*a*, comprising instructions (readable and executable by the processing circuitry of each slave module) to close an upstream switch 18*a* such that a shunting upstream signal path 30 is formed, as indicated in FIG. 4*b*. The first slave module 6*a* further comprises an upstream receiving node 43 and an upstream transmitting node 44 along the upstream signal path. The upstream transmitting node may include an upstream tri-state buffer which has a high impedance mode. The processing circuitry 15 in the first slave module may then be configured to set the upstream tri-state buffer in a high impedance mode before closing the upstream switch 18*a*. This is in order to minimize bus contention. After the shunting upstream signal path 30 is formed, the first slave module 6*a* transmits a signal to the subsequent slave module 6*b* in the chain which is configured to perform a corresponding procedure, i.e. close an upstream switch 18*a* and optionally to set a tri-state buffer in the upstream transmitting node 44 to a high impedance mode.

This process is repeated in each slave module 6 along the chain of slave modules 6 in the system 1 until all of the upstream signal paths 29 are shunted and a type of ring-architecture is achieved, where the last slave module 6*c* is directly connected to the master module 2 (i.e. able to communicate directly with the master module 2).

The master module 2 may furthermore be configured to calculate a time-estimate of this "switching" procedure, i.e. the time it should take for each slave module 6 in the system to have a shunted upstream signal path, from the information retrieved during the addressing procedure (i.e. how many slave modules, at which position and which type). Thus, the master module 2 may perform a status check after this estimated amount of time.

The speed capabilities of the system 1 are increased by switching to the operating state instead of remaining in the start-up state. For example, in the status check scenario, the master module 2 requesting a status update from each slave module 6 can send a request to the first slave module 6*a* which relays the request further down the chain to the second module, but attaches its own status information to the relayed signal, which continues along the chain until it reaches the last module 6*c* which transmits a signal containing information about all of the slave modules' 6 status directly to the master module, instead of the master module 2 asking each slave module 6 individually, similarly to the addressing procedure described earlier. This first operating state could also be referred to as a semi-parallel (or ring mode) state.

The optical bus system 1 may further include a reset state, for example in the case of some error in the system, e.g. the status check procedure failing or if there is an interruption in a power supply 26. During this reset state, each slave module 6 is configured to, upon receipt of a reset signal to open the upstream switch 18*a* and thereby disconnect the shunting upstream signal path 30 in order to bring the system 1 back to a daisy-chain configuration (i.e. start-up state). The reset signal can be initiated by the master module 2 and transmitted to the first slave module 6*a* via the downstream optical path 24 between them; the reset signal is subsequently relayed by each slave module 6 in the chain after the upstream switch 18*a* is opened in each slave module 6. The reset signal is preferably a pulse signal of a predefined length, e.g. having a pulse length that is substantially longer than any of the normal pulses received during regular operation. Thus, during the reset state the system 1 is brought from the operating state shown in FIG. 4*b* to the start-up state shown in FIG. 4*a*.

Figure 5A:
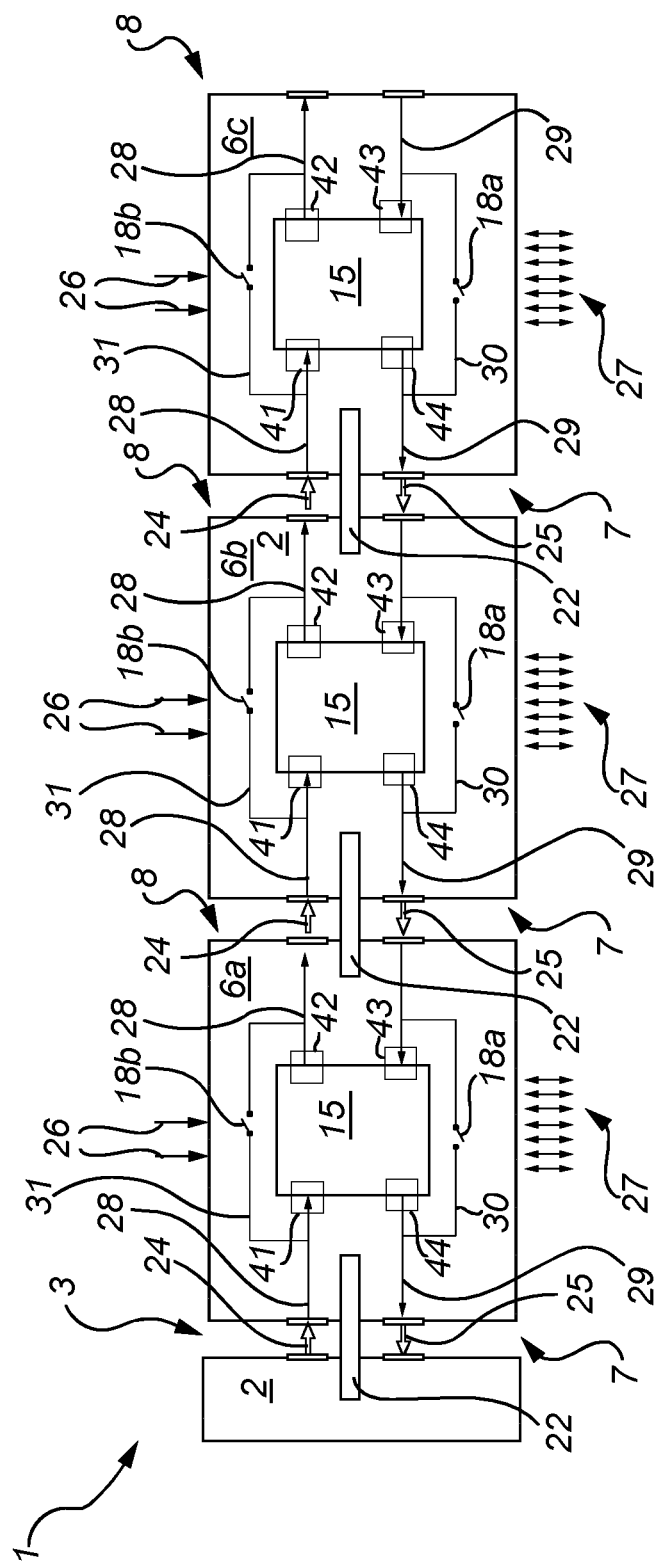
FIG. 5a illustrates a block diagram representation of an optical bus system in a start-up state in accordance with another embodiment of the present invention.

FIG. 5*a* illustrates an optical bus system 1 operating in a start-up state in a block diagram representation in accordance with another embodiment of the invention. The above discussion in reference to FIG. 4*a* is in large part equally applicable to this embodiment, whereby the discussion concerning the same parts or functions are considered to be described. The optical bus system 1 illustrated in FIG. 5*a* mainly differs from the system in FIG. 4*a* in that this system 1 can operate in a second operating state. After the power-up of the system 1 and the completion of an addressing procedure (same as the one described in reference to FIGS. 4*a-b*), the optical bus system 1 can switch to a second operating state.

Figure 5B:
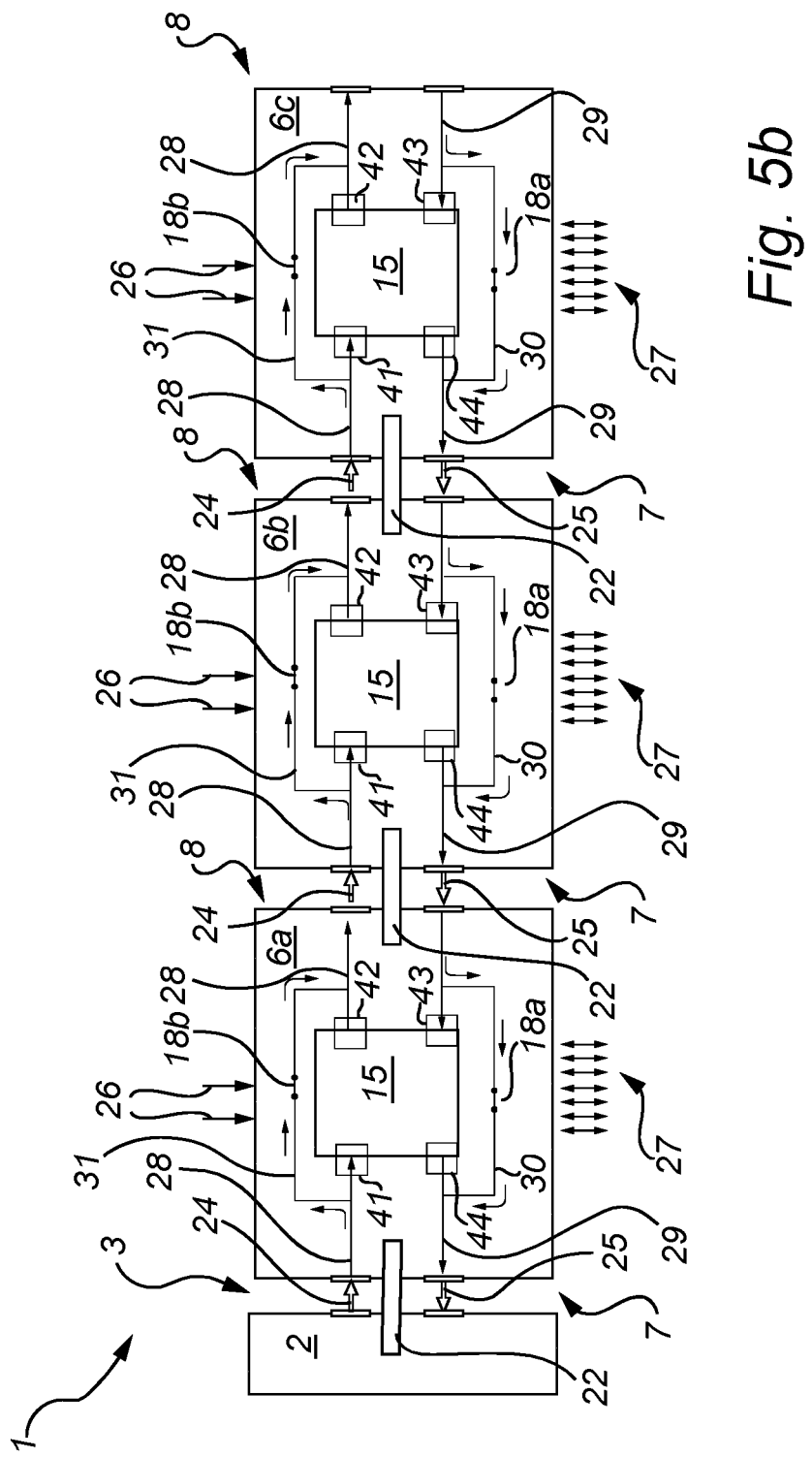
FIG. 5b illustrates a block diagram representation of the optical bus system from FIG. 5a in a second operating state.

The master module 2 sends a control signal, to the first slave module 6*a*, comprising instructions (readable and executable by the processing circuitry 15 of each slave module 6) to close a downstream switch 18*b* such that a shunting downstream signal path 31 is formed, as indicated by the flow of arrows along the downstream signal path 31 in FIG. 5*b*. Further, the processing circuitry 15 of the first slave module 6*a* is also configured to close an upstream switch 18*a* such that a shunting upstream signal path 30 is formed which is also indicated by the flow of arrows along the upstream shunting signal path 30 in FIG. 5*b*. This effectively forms a direct communication path (parallel connection) between the master module 2 and each slave module 6 in the system. Thus, this second operating state may be referred to as a parallel state or master-slave state.

The processing circuitry may further be configured to set a tri-state buffer at each transmitting node 42, 44 to a high impedance mode before the switches 18*a*, 18*b* are closed in order to minimize bus contention.

The general shunting process is repeated in each slave module 6 in the chain of slave modules 6 until all of the downstream and upstream signal paths in each slave module are shunted. Hereby a direct two-way communication path between the master module 2 and each slave module 6 in the optical bus system 1 is achieved, which drastically increases the bandwidth of the system and furthermore enables communication via broadcast protocols. The master module 2 can send data to a specific slave module 6 e.g. by having a unique identifier added to the bit-sequence, the identifier being derived from the retrieved identification-code during the addressing procedure. Furthermore, the master module 2 may be configured to request a status report from each slave module 6, whereby each slave module is configured to transmit a signal indicating a status on the upstream optical bus. In this scenario the optical bus system 1 may be configured such that each slave module 6 transmits the status signal in a predefined sequential order. Each module 2, 6 is preferably arranged with UART universal asynchronous receiver/transmitter) capability in case of bus congestion.

The system 1 may further include another reset state, for example in the case of some error in the system, e.g. a status check procedure failing or if there is an interruption in the power supply. During this reset state, each slave module 6 is configured to, upon receipt of a reset signal to open the upstream switch 18*a* and the downstream switch 18*b*, and thereby disconnect the shunting upstream signal path 30 and the shunting downstream signal path 31 in order to bring the system 1 back to a daisy-chain configuration (i.e. start-up state). The reset signal can be initiated by the master module 2 and broadcasted to all of the slave modules 6 in the system 1 or it may be transmitted to the first slave module 6*a* via the downstream optical path 24 between them. In case of the latter, the reset signal is subsequently relayed by each slave module 6 in the chain after the upstream switch 18*a* and the downstream switch 18*b* are opened in each slave module 6. The reset signal is preferably a pulse signal of a predefined length, e.g. having a pulse length that is substantially longer than any of the normal pulses received during regular operation. Thus, during the reset state the system 1 is brought from the operating state shown in FIG. 5*b* to the start-up state shown in FIG. 5*a*.

The invention claimed is:

1. An optical bus system having a start-up state and an operating state, said system comprising:
   a mechanical support structure;
   a master module mechanically attached to said mechanical support structure, said master module comprising a downstream optical communication interface comprising a master optical transmitter and a master optical receiver;
   a set of slave modules mechanically attached to said mechanical support structure sequentially in a row next to said master module, the set of slave modules including a first slave module arranged next to said master module and at least one subsequent slave module, each slave module including:
      processing circuitry,
      an upstream optical communication interface comprising an upstream optical receiver and an upstream optical transmitter,
      a downstream optical communication interface comprising a downstream optical receiver and a downstream optical transmitter,
      a downstream signal path from said upstream optical receiver to said downstream optical transmitter via said processing circuitry, and
      an upstream signal path from said downstream optical receiver to said upstream optical transmitter via said processing circuitry;
   wherein the upstream optical communication interface of the first slave module is in optical contact with the downstream optical communication interface of the master module, and the upstream optical communication interface of each subsequent slave module is in optical contact with a downstream optical communication interface of a preceding slave module in the row, in order to enable optical communication between adjacent modules;

wherein, during said start-up state, in each slave module, said processing circuitry is configured to implement a daisy-chain topology and to perform an addressing procedure whereby said master module is configured to retrieve a position and an identity code of each slave module;

wherein, during said operating state, in each slave module, said processing circuitry is configured to close an upstream switch such that a shunting upstream signal path is formed from said downstream optical receiver to said upstream optical transmitter, in addition to said upstream signal path, the shunting upstream signal paths of the set of slave modules together forming an upstream optical bus allowing each slave module to communicate directly with said master module using said positions and identity codes.

2. The optical bus system according to claim 1, wherein:
said upstream signal path includes an upstream receiving node and an upstream transmitting node;
said upstream transmitting node comprises an upstream tri-state buffer having a high-impedance mode; and
during said operating state, in each slave module, said processing circuitry is configured to generate a control signal such that said tri-state buffer is in the high impedance mode before said upstream switch is closed, in order to reduce bus contention.

3. The optical bus system according to claim 2, wherein:
said operating state is a first operating state;
said optical bus system further comprises a second operating state; and
during said second operating state, in each slave module, said processing circuitry is configured to:
close a downstream switch such that a shunting downstream signal path is formed from said downstream optical receiver to said downstream optical transmitter, in addition to said downstream signal path, the shunting downstream signal paths of the set of slave modules together forming a downstream optical bus so that information received by the optical receiver of the first slave module is broadcasted to all slave modules in the set, whereby said master module can communicate directly with each slave module in said set of modules using said positions and identity codes; and
close an upstream switch such that a shunting upstream signal path is formed from said downstream optical receiver to said upstream optical transmitter, in addition to said upstream signal path, the shunting upstream signal paths of the set of slave modules together forming an upstream optical bus allowing slave module to communicate directly with said master module using said positions and identity codes.

4. The optical bus system according to claim 3, wherein:
said downstream signal path includes a downstream receiving node and a downstream transmitting node;
said downstream transmitting node comprises a downstream tri-state buffer having a high-impedance mode; and
during said second operating state, in each slave module, said processing circuitry is configured to generate a control signal such that said downstream tri-state buffer is in the high-impedance mode before said downstream switch is closed, in order to reduce bus contention.

5. The optical bus system according to claim 4, further comprising a reset state, wherein during, said reset state, in each slave module, said processing circuitry is configured to, upon receipt of a reset signal having a pulse length of a predefined length at said upstream optical receiver, open said upstream switch, open said downstream switch and transmit said reset signal at said downstream optical transmitter, in order to reset the system to said start-up state.

6. The optical bus system according to claim 3, further comprising a reset state, wherein during, said reset state, in each slave module, said processing circuitry is configured to, upon receipt of a reset signal having a pulse length of a predefined length at said upstream optical receiver, open said upstream switch, open said downstream switch and transmit said reset signal at said downstream optical transmitter, in order to reset the system to said start-up state.

7. The optical bus system according to claim 2, further comprising a reset state, wherein during, said reset state, in each slave module, said processing circuitry is configured to, upon receipt of a reset signal having a pulse length of a predefined length at said upstream optical receiver, open said upstream switch and transmit said reset signal at said downstream optical transmitter, in order to reset the system to said start-up state.

8. The optical bus system according to claim 1, wherein said operating state is a first operating state and wherein said optical bus system further comprises a second operating state, wherein, during said second operating state, in each slave module,
said processing circuitry is configured to:
close a downstream switch such that a shunting downstream signal path is formed from said downstream optical receiver to said downstream optical transmitter, in addition to said downstream signal path, the shunting downstream signal paths of the set of slave modules together forming a downstream optical bus so that information received by the optical receiver of the first slave module is broadcasted to all slave modules in the set, whereby said master module can communicate directly with each slave module in said set of modules using said positions and identity codes; and
close an upstream switch such that a shunting upstream signal path is formed from said downstream optical receiver to said upstream optical transmitter, in addition to said upstream signal path, the shunting upstream signal paths of the set of slave modules together forming an upstream optical bus allowing slave module to communicate directly with said master module using said positions and identity codes.

9. The optical bus system according to claim 8, wherein:
said downstream signal path includes a downstream receiving node and a downstream transmitting node;
said downstream transmitting node comprises a downstream tri-state buffer having a high-impedance mode; and
during said second operating state, in each slave module, said processing circuitry is configured to generate a control signal such that said downstream tri-state buffer is in the high impedance mode before said downstream switch is closed, in order to reduce bus contention.

10. The optical bus system according to claim 9, further comprising a reset state, wherein during, said reset state, in each slave module, said processing circuitry is configured to, upon receipt of a reset signal having a pulse length of a predefined length at said upstream optical receiver, open said upstream switch, open said downstream switch and transmit said reset signal at said downstream optical transmitter, in order to reset the system to said start-up state.

11. The optical bus system according to claim 8, further comprising a reset state, wherein during, said reset state, in each slave module, said processing circuitry is configured to, upon receipt of a reset signal having a pulse length of a predefined length at said upstream optical receiver, open said upstream switch, open said downstream switch and transmit said reset signal at said downstream optical transmitter, in order to reset the system to said start-up state.

12. The optical bus system according to claim 1, further comprising a reset state, wherein during, said reset state, in each slave module, said processing circuitry is configured to, upon receipt of a reset signal having a pulse length of a predefined length at said upstream optical receiver, open said upstream switch and transmit said reset signal at said downstream optical transmitter, in order to reset the system to said start-up state.

13. The optical bus system according to claim 1, wherein each slave module is arranged with a separate power supply.

14. The optical bus system according to claim 1, wherein:
the downstream optical interface of the master module comprises one optical window in optical connection with each of said master optical transmitter and said master optical receiver via an optical guide;
the downstream optical interface of each slave module comprises one optical window in optical connection with each of said downstream optical transmitter and said downstream optical receiver via an optical guide; and
the upstream optical interface of each slave module comprises one optical window in optical connection with each of said upstream optical transmitter and said upstream optical receiver via an optical guide.

15. The optical bus system according to claim 14, wherein said optical shield comprises a protruding member arranged between the optical transmitter and the optical receiver of said downstream communication interface, and wherein said protruding member is arrangeable in a corresponding recess arranged between the optical transmitter and the optical receiver of said upstream communication interface.

16. The optical bus system according to claim 1, wherein:
each adjacent upstream communication interface and downstream communication interface arranged in optical contact with each other includes a downstream optical communication path and an upstream optical communication path; and
said optical bus system comprises an optical shield arranged between each downstream optical communication path and upstream communication path, in order to reduce crosstalk and enable full-duplex communication.

* * * * *